United States Patent [19]

Rowlings

[11] 4,074,550
[45] Feb. 21, 1978

[54] VEHICLE IGNITION SWITCH LOCK DEVICE

[76] Inventor: James W. Rowlings, 93 St. Gregory St., Dorchester, Mass. 02124

[21] Appl. No.: 730,641

[22] Filed: Oct. 7, 1976

[51] Int. Cl.$^2$ .................... B60R 25/00; H01H 9/28
[52] U.S. Cl. ........................................ 70/237; 70/18; 70/428; 200/44; 200/61.54
[58] Field of Search .............. 70/15, 18, 54, 55, 158, 70/163, 164, 166, 167, 211, 212, 232, 237, 252, 423–428, 447, 448; 180/114; 200/44, 45, 61.54

[56] References Cited

U.S. PATENT DOCUMENTS

| | | | |
|---|---|---|---|
| 1,239,292 | 9/1917 | Mundell | 70/237 |
| 3,665,738 | 5/1972 | Pescuma et al. | 70/237 X |
| 3,800,570 | 4/1974 | Kaplan | 70/54 X |
| 3,811,303 | 5/1974 | Robertson | 70/237 |
| 3,866,445 | 2/1975 | Erwin | 70/428 |
| 3,924,426 | 12/1975 | Zane et al. | 70/18 |
| 3,948,069 | 4/1976 | Imbriano | 70/418 X |

Primary Examiner—Roy D. Frazier
Assistant Examiner—William E. Lyddane
Attorney, Agent, or Firm—Clarence A. O'Brien; Harvey B. Jacobson

[57] ABSTRACT

A vehicle ignition switch lock device comprising a cover member of rectangular box-like shape which will fit over the ignition lock on the steering column of a vehicle and having as part of the cover member a cylindrical heavy stainless steel cylinder which completely covers and surrounds the vehicle ignition switch. Two leg portions on the box-like member extend past the steering column and receive on the other side thereof a solid steel bar through appropriate apertures provided in the leg members. One of the leg members has a covered steel cylinder member which contains a cylindrical lock with arm member for engagement with an one end of the steel bar through a slot therein. The entire device preferably is made of saw and drill resistant stainless steel material and the cylindrical lock is of the pickproof type. The cylindrical lock is designed so that the key is non-removable from same except when the lock is in the locked position.

9 Claims, 5 Drawing Figures

VEHICLE IGNITION SWITCH LOCK DEVICE

BACKGROUND OF THE INVENTION

This invention relates generally to devices for providing security and theftproofing of automotive type vehicles and especially for a security lock device for covering and protecting the vehicle ignition switch.

DESCRIPTION OF THE PRIOR ART

A common problem with known type devices for preventing theft of automotive type vehicles is that many of them block or prevent the steering mechanism from turning or operating. Such devices fail to prevent the automobile engine from being started and thus completely deter theft of the vehicle.

Another problem with known type devices is that they are often of pivotal type construction which complicates and makes the installation more difficult than is desired for the average ordinary user.

Another problem with known type devices is that the security device itself is not pickproof or theftproofed.

Also, most known type devices are unduly complicated, relatively expensive to make, difficult to install, and thus defeat the practical application of same.

Known prior art patents which may be pertinent to this invention are as follows:

U.S. Pat. No. 1,213,811, Smith, January 23, 1917;
1,590,981, Lockyer, June 29, 1926;
1,828,658, Henke, Jr., October 20, 1931;
2,458,002, Kaskouras, January 4, 1949;
3,180,473, Garvey, April 27, 1965;
3,401,543, Lewis, September 17, 1968;
3,665,738, Pescuma et al, May 30, 1972;
3,811,303, Robertson, May 21, 1974.

None of these known prior art devices offers the new and unique features of the invention disclosed herein.

SUMMARY OF THE INVENTION

An object of the present invention is to provide a vehicle switch ignition lock device which will provide security and discourage and prevent the picking or otherwise bypassing of the ignition switch as normally provided on the steering column of an automotive type vehicle.

Another object of the present invention is to provide a vehicle ignition lock device which will fit upon the steering column of such vehicle and completely enclose and encase the key operated switch as is conventional on such columns.

A further object of this invention is to provide a security lock device for vehicles employing an ignition type switch with said security device completely enclosing and covering said switch to protect the switch from being popped out, damaged, or picked. The security device itself is virtually pick-resistant and jimmyproof, resists drilling and sawing, and together with special shield guards completely prevents access to the ignition lock on the steering column. It is extremely easy to assemble and install.

A still further object of this invention is to provide a security device for automotive type vehicles having a steering column with ignition switch mounted thereon with the security device being readily installed and after installation completely covering the switch.

The vehicle switch ignition lock device of this invention has a number of very important features. The entire security device is of steel construction of relatively simple maintenance free type. A quickly installed slidable bar member is used to secure the security device to the steering column. A pickproof cylinder type lock positively retains the steel bar in place on the steering column while protective edge liners and gasket material between the steel bar and the steering column prevent damage or marring of the vehicle steering column. This security auto lock is made to protect one's vehicle and make same more secure when the vehicle is left unattended such as while at shopping, at work, at school, at church, at sporting events, and at airports, etc.

This security automotive type vehicle lock device is preferably made of stainless steel material and is made to protect one's vehicle from being stolen by thieves. The lock is designed to fit over the ignition switch as is conventional on vehicle steering columns and to cover the entire switch mechanism. This protects the ignition from being popped out, damaged, or picked. This security lock device being made of hard durable stainless steel is virtually drill and saw resistant and jimmyproof, it resists drilling of the ignition lock, and with the special shield guards which are part of the security device the ignition switch is completely covered and protected on the steering column. Also, the cylindrical lock structure for positively retaining the overall device on the steering column is protected against picking and opening of same by unauthorized persons. The overall device is of relatively simple construction, is very easy to install, is relatively maintenance free, and relatively inexpensive to make and distribute. This should greatly increase the overall use and application of same.

In order to protect the steering column when the locking device is being put thereon a protective polyvinyl type edge strip is provided. This is preferably of white colored material which completely lines the exposed edges of the device in order to protect the steering column or the vehicle from being scratched or damaged. Also, in order to protect the steering column from scratching and damage the locking bar which forms the second component of the overall device is prevented from marring the steering column by means of a polyvinyl open cell gasket which has adhesive on the backside thereof and is applied to the bar engaging portion of the steering column prior to installation of the overall device. This plastic open cell gasket will definitely protect the steering column against scratching and damage.

Also, the cylindrical lock cylinder which is used with the device to positively lock the bar in place and prevent its unauthorized removal is set in a stainless steel ring which protects this lock cylinder from being picked or otherwise damaged and tampered with. This is an additional safety feature.

Furthermore, cylindrical cup members are provided for both the cylindrical lock for the bar and also to completely cover the ignition switch lock. Both of these cylindrical safety shields are of heavy thick steel at least ⅛ inch in thickness and also very resistant to damage by drilling, filing, sawing, etc., or tampering with by thieves and other unauthorized persons.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
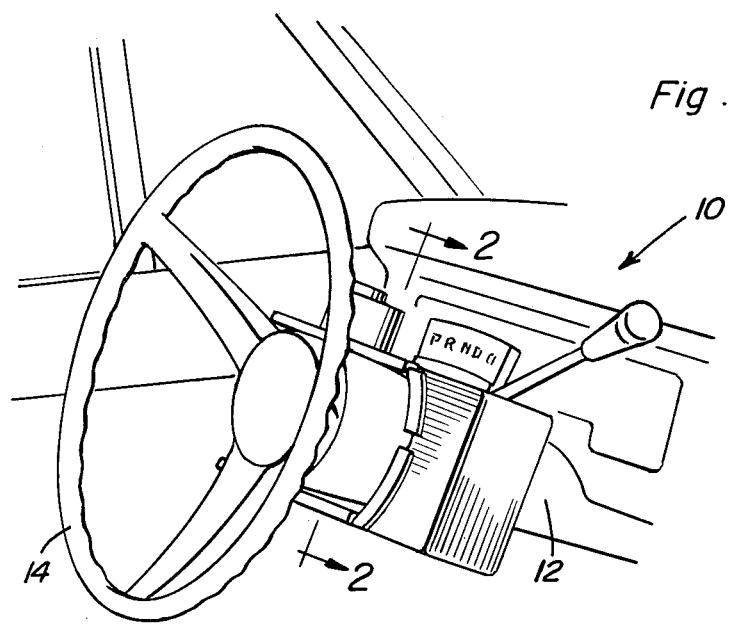
FIG. 1 is a perspective view of the vehicle ignition switch lock device of this invention as installed upon the steering column of an automotive type vehicle.

Referring to FIG. 1 of the drawings, reference numeral 10 indicates in general the vehicle switch ignition lock device of this invention as installed on a conventional type steering column of an automotive type vehicle. The steering column is indicated by reference numeral 12 which supports in a conventional manner a steering wheel 14. Looking at FIG. 2 the steering column 12 may be seen in cross section together with the drive shaft 16 which is connected between the steering wheel 14 and the automotive or vehicle steering box, not shown. Mounted upon the side of the steering column in a conventional manner is an automotive vehicle switch 20 which normally turns on the ignition system of the vehicle. Wires 22 normally are provided between said switch and such ignition system. In some vehicle systems this switch 20 actuates through mechanical means an ignition switch lower down on the steering column, and also in many vehicle applications a mechanical mechanism coupled to the steering device and structure is also actuated. The type of vehicle connection and operation is basically immaterial for use of this security device. The basic concept being that the steering column ignition switch will be completely protected and enclosed so as to prevent unauthorized people such as thieves from operating, picking, or otherwise turning the switch.

Figure 2:
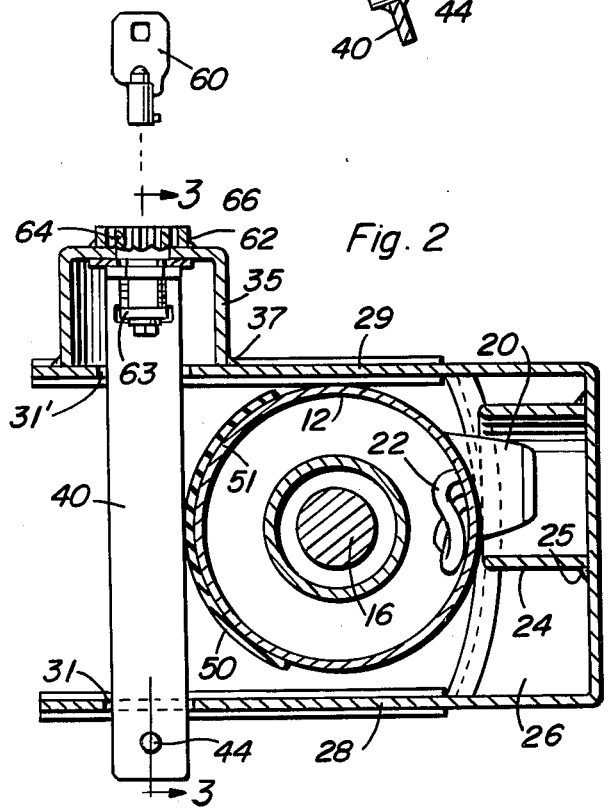
FIG. 2 is a plan view, partly in cross section, taken generally along line 2—2 of FIG. 1.

The basic security device is a relatively box-like structure 26 having mounted therein a cylinder or tubular member 24 of steel material appropriately welded or brazed to the interior of the box at the contact point thereof such as at 25 in FIG. 2. The box-like member 26 is provided with extending leg members 28 and 29 which are of sufficient length to completely pass by and extend past the steering column. The lower leg 28 as seen in the respective Figures is provided with an elongated slot or aperture 31 near the outer end thereof. The upper leg 29 is provided with a corresponding slot 31' in a position to match or align with the lower slot 31.

Figure 3:
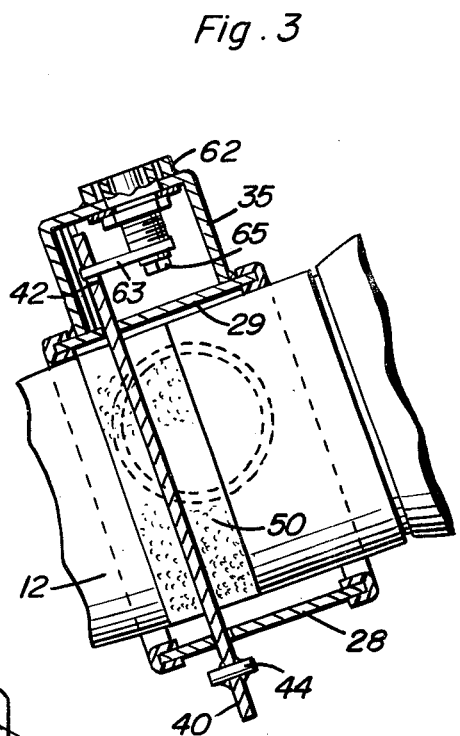
FIG. 3 is a side view, partly in cross section, taken generally along line 3—3 of FIG. 2.
Figure 5:
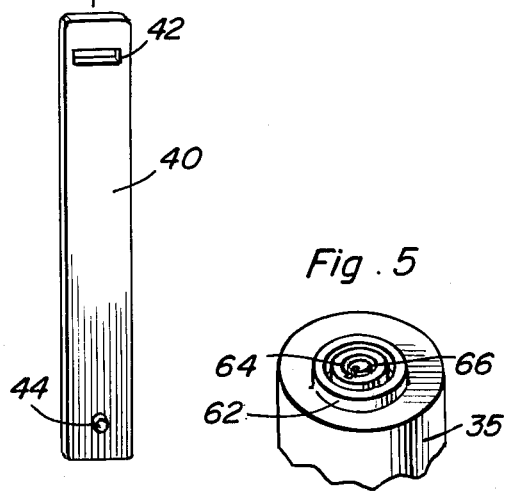
FIG. 5 is perspective view of the security device cylindrical lock encasement mounting structure per se.

The upper leg 29 also is provided with a cylindrical protective cover member 35 appropriately fastened to the outside of this leg member by welding or brazing and the like such as 37. Mounted in this cylindrical cover member is a cylindrical lock set in a stainless steel ring 62. This lock is indicated by reference numeral 64 and as shown in FIG. 5 has a key aperture 66 provided therein in a conventional manner. Various types of cylindrical locks may be used with this device and the basic detailed construction is not material. The primary requirement being that the lock itself be pickproof and of such metal construction that it may not be easily drilled or otherwise damaged or removed. As seen in FIG. 3 the inner shaft of the cylindrical lock 65 has provided for rotatable turning movement therewith a locking arm member 63. This locking arm member 63 will normally be in the position as shown in FIGS. 2 and 3 when the cylindrical lock is in the locked position. A key 60 is normally engageable in the lock slot 66 for actuating same. This lock is preferably designed so that the key is only removable when the lock is turned so as to be in the locked position, i.e., with the locking member 63 as shown in FIG. 3. When the key is turned to move the locking member 63 away from the slot 42 in the slide bar 40 the key no longer is removable. This is a safety feature to prevent the loss of the key when the device is unassembled and uninstalled and lying around ready for use, or as stored for distribution and sale of same.

A slidable locking bar 40 is used to positively retain the box-like member 36 with its extending legs 28 and 29 mounted and installed on the vehicle steering column. Once the device is placed in position on the steering column the bar 40 is slid through aperture 31 and then through aperture 31' to a position where the slot 42 will be in alignment with the movable and rotatably mounted locking arm member 63 on the lower end of the cylindrical lock. Then, when the key 60 is turned in the direction to rotate the lock cylinder, the locking arm member 63 will move into position within slot 42 and positively retain the locking bar in place. This positively prevents the overall security device from being removed from the steering column. A pin 44 is provided through the lower end of locking bar 40 to prevent the end without the slot 42 therein from being inserted first, i.e., prevents bar 40 from being installed incorrectly.

Figure 4:
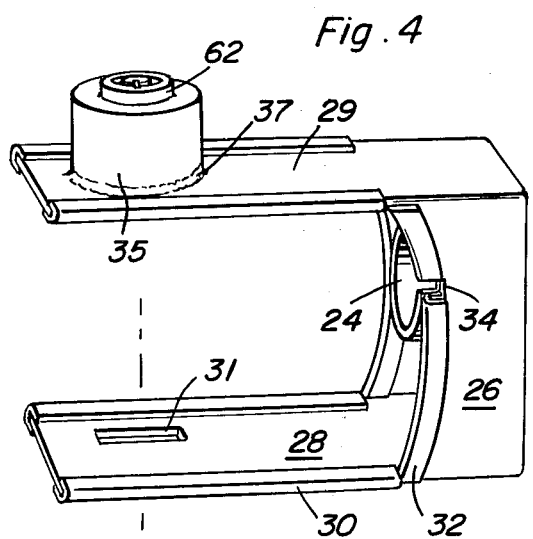
FIG. 4 is a perspective, exploded view of the component parts of the security device prior to installation of same on a steering column of a vehicle.

To protect the steering column of the vehicle from scratching or other damage as the device is installed and used protective cover edging 30 is provided along the edges of the legs 28 and 29 as well as the open edges of the box-like member 26. As best seen in FIG. 4 this protective edging will clearly prevent the edges of the security device from scratching or otherwise damaging the steering column. Said material is preferably of white durable protective material such as polyvinyl edge stripping. Also, in order to protect the steering column from damage by the locking bar 40, the device is normally distributed and sold with a piece of resilient, open cell gasket material 50 which also may be of polyvinyl material. This strip of gasket material is normally distributed with adhesive material on one side thereof with a protective backing, not shown, normally provided over the adhesive material to protect same and prevent inadvertent sticking to undesired surfaces prior to the desired application to a steering column. This adhesive is indicated by reference numeral 51 in FIG. 2.

For maximum security and strength the overall device is preferably made of No. 3 or 4 stainless steel material. The yoke frame consisting of the box-like member 26 with the legs 28 and 29 for forming the primary part of the locking device is preferably of ⅛ inch thick steel. The overall device normally will be approximately 8 inches by 2½ inches. The cylindrical safety shield cup 24 that covers the ignition switch lock is preferably of ⅛ inch thick material by 2 inches in diameter by 1½ inches deep.

The lock encasement, which holds the cylindrical tube lock 64, is also preferably ⅛ inch thick by 2 inches in diameter by 1 ⅜ inches deep. The flat locking bar 40 which slides through the slots 31 and 31' into the lock encasement 35 is preferably ¼ inch thick by 1½ inches wide by 7 inches long. The cylindrical lock 64 normally is set in a stainless steel ring 62 to add further security to the overall device.

The overall security device of this invention is very easy to install for theft protection on a vehicle steering column. The user picks up the security device, puts in the key 60, unlocks the cylindrical lock 64 and pulls out the flat bar 40. The primary cover member 26 together with the legs 28 and 29 are then put over the steering column and the protective shield cylinder 24 carefully aligned so as to cover the vehicle ignition switch. At this moment the outer ends of the legs 28 and 29 are extending past the steering column on the left side thereof as viewed from the driving position. The flat bar 40 is then inserted through the lower aperture 31 and slid upwardly through the other aperture 31' until the end of the bar reaches the inner end of the cylindrical member 35. The key 60 is then turned so as to move the locking arm member 63 into position with the end thereof in the slot 42 of the bar 40. At this point the key 60 may by removed from the lock 64.

It is a good safety precaution to put the security lock key 60 on the same key ring as your basic vehicle ignition switch key. This will prevent inadvertent misplacement or loss of same.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A vehicle ignition switch lock device installable about the vehicle steering column in surmounting relation to an ignition switch mounted on said steering column, the device comprising:
    a solid-walled housing member adapted to fit against a side portion of the steering column, the housing member having an opening disposed in at least a portion of one side thereof, the opening receiving the ignition switch therewithin to substantially cover the ignition switch;
    a pair of leg members extending from the housing member on opposite sides of the opening therein, the leg members being tangentially contiguous to the steering column and being of a length greater than the diameter of said steering column, free ends of the leg members lying in spaced opposed relation to each other beyond the edges of the column when the device is mounted on said column, the free ends of the leg members each having an elongated aperture formed therein;
    a bar member, the bar member being received within the apertures in the free ends of the leg members, the bar member, the leg members, and the body of the housing member essentially circumscribing the steering column, the bar member further having an elongated slot formed in one end thereof;
    lock means having a positionally displaceable latch member and carried on one of the leg members, the latch member being engageable within the slot in the bar member to lock the bar member to the leg members, thereby to lock the device onto the steering column; and
    a shielding member disposed within the housing member and attached to an inner wall thereof, the longitudinal axis of the shielding member being perpendicular to the longitudinal axis of the steering column when the device is mounted on said column, the ingition switch being thereby enclosed and covered by the shield member.

2. The structure set forth in claim 1, wherein the exposed edges of the extending leg members are covered with resilient edge material in order to prevent scratching and damage to the vehicle steering column as the device is installed.

3. The structure set forth in claim 2, together with a resilient gasket strip for protecting the side of the steering column adjacent to the bar member when the device is installed.

4. The structure set forth in claim 3, wherein the entire device is made of stainless steel material for extra resistance against unauthorized opening of same.

5. The structure set forth in claim 4, wherein the lock means comprises a key operated cylindrical lock and the key for the cylindrical lock is only removable when the cylindrical lock is in locked position to prevent loss of the key when the device is unlocked.

6. The device of claim 1 and further comprising a hollow shield housing attached to one of the leg members in surmounting relation to the aperture formed in said one leg member, the lock means being mounted in said shield housing, the shield housing enclosing at least major portions of the lock means including the latch member, the lock means being thereby spaced from said one leg member and disposed in spaced relation to the aperture in said one leg member.

7. The device of claim 1 wherein the bar member has a pin mounted on the end thereof opposite the end having the slot formed therein, the pin preventing passage through the aperture in the leg members of that end of the bar member in which said pin is disposed.

8. The device of claim 1 wherein the leg members are parallel to each other.

9. The device of claim 1 wherein the shielding member is cylindrical.

* * * * *